US008285991B2

(12) United States Patent
Scheidt

(10) Patent No.: US 8,285,991 B2
(45) Date of Patent: *Oct. 9, 2012

(54) ELECTRONICALLY SIGNING A DOCUMENT

(75) Inventor: Edward M. Scheidt, McLean, VA (US)

(73) Assignee: TecSec Inc., Hearndon, VA (US)

( * ) Notice: Subject to any disclaimer, the term of this patent is extended or adjusted under 35 U.S.C. 154(b) by 664 days.

This patent is subject to a terminal disclaimer.

(21) Appl. No.: 12/368,532

(22) Filed: Feb. 10, 2009

(65) Prior Publication Data

US 2010/0169651 A1 Jul. 1, 2010

Related U.S. Application Data

(60) Continuation-in-part of application No. 11/673,755, filed on Feb. 12, 2007, now Pat. No. 7,490,240, which is a division of application No. 10/035,817, filed on Oct. 25, 2001, now Pat. No. 7,178,030.

(60) Provisional application No. 60/242,713, filed on Oct. 25, 2000.

(51) Int. Cl.
H04L 29/06 (2006.01)

(52) U.S. Cl. ........ 713/170; 380/277; 380/260; 380/259; 380/280; 713/185; 713/173; 713/171; 713/168; 713/176; 709/238; 709/239; 709/240

(58) Field of Classification Search .................. None
See application file for complete search history.

(56) References Cited

U.S. PATENT DOCUMENTS

| 5,195,133 | A |  | 3/1993 | Kapp et al. |
| 5,208,853 | A |  | 5/1993 | Armbruster et al. |
| 5,347,580 | A |  | 9/1994 | Molva et al. |
| 5,442,707 | A |  | 8/1995 | Miyaji et al. |
| 5,647,017 | A |  | 7/1997 | Smithies et al. |
| 5,659,616 | A | * | 8/1997 | Sudia ............................. 705/76 |
| 5,844,988 | A |  | 12/1998 | Ryan et al. |
| 5,867,578 | A |  | 2/1999 | Brickell et al. |
| 6,035,402 | A |  | 3/2000 | Vaeth et al. |
| 6,079,621 | A |  | 6/2000 | Vardanyan et al. |
| 6,185,685 | B1 |  | 2/2001 | Morgan et al. |
| 6,209,091 | B1 |  | 3/2001 | Sudia et al. |
| 6,212,277 | B1 |  | 4/2001 | Miyaji |
| 6,401,206 | B1 | * | 6/2002 | Khan et al. .................... 713/176 |
| 6,490,680 | B1 |  | 12/2002 | Scheidt et al. |
| 6,542,608 | B2 | * | 4/2003 | Scheidt et al. .................. 380/44 |
| 6,549,623 | B1 | * | 4/2003 | Scheidt et al. .................. 380/44 |
| 6,553,494 | B1 | * | 4/2003 | Glass ............................. 713/186 |
| 6,907,529 | B1 | * | 6/2005 | Hirose ............................. 726/5 |
| 7,178,030 | B2 | * | 2/2007 | Scheidt et al. ................ 713/176 |

(Continued)

FOREIGN PATENT DOCUMENTS

WO  WO 2007053864 A1 *  5/2007

Primary Examiner — Syed A. Zia
(74) Attorney, Agent, or Firm — IP Strategies

(57) ABSTRACT

An electronic signature device includes a processor, a memory, a user input device including a first biometric input device, and a device interface, all communicatively connected by at least one bus. A method of personalizing the electronic signature device to a user includes receiving a digitized biometric signature of the user via the first biometric input device. A cryptographic key is generated. A biometric electronic template is generated based on the digitized biometric signature. The cryptographic key and the biometric electronic template are stored in the memory.

35 Claims, 5 Drawing Sheets

Fig. 2

U.S. PATENT DOCUMENTS

| | | | |
|---|---|---|---|
| 7,693,286 B2 * | 4/2010 | Sutton et al. | 380/282 |
| 7,716,493 B2 * | 5/2010 | Bowers | 713/186 |
| 7,733,804 B2 * | 6/2010 | Hardjono et al. | 370/254 |
| 7,764,795 B2 * | 7/2010 | Philips | 380/283 |
| 7,792,303 B2 * | 9/2010 | Brickell et al. | 380/282 |
| 7,793,107 B2 * | 9/2010 | Takahashi | 713/176 |
| 7,904,727 B2 * | 3/2011 | Bleckmann et al. | 713/176 |
| 7,917,761 B2 * | 3/2011 | Cahill et al. | 713/176 |
| 7,933,840 B2 * | 4/2011 | Zank | 705/64 |
| 7,953,814 B1 * | 5/2011 | Chasin et al. | 709/207 |
| 8,041,952 B2 * | 10/2011 | Parry | 713/176 |
| 8,046,585 B2 * | 10/2011 | Parkinson | 713/176 |
| 8,122,255 B2 * | 2/2012 | Merrill | 713/176 |
| 2002/0016910 A1 * | 2/2002 | Wright et al. | 713/150 |
| 2002/0150241 A1 * | 10/2002 | Scheidt et al. | 380/44 |
| 2007/0277040 A1 * | 11/2007 | Scheidt et al. | 713/176 |
| 2008/0010218 A1 * | 1/2008 | Zank | 705/75 |
| 2011/0060906 A1 * | 3/2011 | Lafon et al. | 713/168 |

* cited by examiner

El-Sig Personalization

El-Sig Originator Process

ELECTRONICALLY SIGNING A DOCUMENT

CROSS REFERENCE TO RELATED APPLICATIONS

This is a continuation-in-part of U.S. patent application Ser. No. 11/673,755, which was filed on Feb. 12, 2007 and is now U.S. Pat. No. 7,490,240, which issued on Feb. 10, 2009; which in turn is a divisional of U.S. patent application Ser. No. 10/035,817, which was filed on Oct. 25, 2001 and is now U.S. Pat. No. 7,178,030, which issued on Feb. 13, 2007; which in turn is related to, and claims the priority benefit of, the following co-pending U.S. patent applications: U.S. Provisional Patent Application No. 60/242,713, filed on Oct. 25, 2000; and U.S. patent application Ser. No. 09/023,672, filed on Feb. 13, 1998.

BACKGROUND OF THE INVENTION

1. Field of the Invention

The present invention is related to a method of electronically signing a document; a device for use in electronically signing a document; and a computer-readable medium that includes instructions for the computer to carry out a method of electronically signing a document.

2. Background Information

Historically, handwritten signatures have been used to identify a particular person and to bind that person to a particular document. A person's signature on a particular document supported the assertion that the person that the person read and/or agreed to the document's content. However, handwritten signatures are subject to forgery.

Imprinting seals have also been historically used for these purposes, with and without accompanying handwritten signatures. However, the reliability of a seal is directly related to the level of difficulty, or overall cost, in replicating or counterfeiting the seal. Further, the value of the seal also depends on whether it is recognized or trusted.

Third-party witnesses have been used to lend further credence to the validity of a particular signature on a particular document. A third-party witness, such as a notary, can also use a difficult-to-reproduce seal. However, this system too depends on whether a verifier accepts the validity or veracity of the third-party attester.

In the past, most commerce was practiced within a limited homogenous population, such that verification of signatures was relatively easy and repudiation claims were resolved quickly. At present, however, the advent of electronic commerce and global economy has created a need for a method of electronically signing a document and corresponding device.

Electronic third-party schemes, such as digital signatures with digital certificates issued and verified by third parties under a Public Key Infrastructure ("PKI"), have proven to be cumbersome. This is especially evident when independent and unrelated PKIs, which can further be unfamiliar with each other, are required to blindly, or even negligently or recklessly, trust representations made by each other.

Therefore, there is a need for a method of electronically signing a document, and for a device that can be used to electronically sign a document. There is also a need to strengthen the written signature-based authentication of documents in a traditional two-party signed transaction using electronic, computer-based authentication mechanisms. There is also a need to strengthen third-party adjudication of the hand-written signature-based authentication of documents with computer-base authentication mechanisms. This should be able to be provided in addition to two-party authentication, and should be able to be applied forensically, that is, to provide evidence during a dispute.

BRIEF SUMMARY OF THE INVENTION

The present invention can be embodied in a method of electronically signing a document, a device adapted to carry out a method of electronically signing a document, and a computer readable medium including instructions for the computer to carry out a method of electronically signing a document. The present invention can be used to bind a graphic representation of a biometric value to a document or to certain key elements of a document. The present invention can also be used to prevent or provide resistance to counterfeiting of the biometric value, and to mathematically bind a biometric value to a person or entity.

According to an exemplary embodiment of the invention, an electronic signature device includes a processor, a memory, a user input device including a first biometric input device, and a device interface, all communicatively connected by at least one bus. A method of personalizing the electronic signature device to a user includes receiving a digitized biometric signature of the user via the first biometric input device. A cryptographic key is generated according to a predetermined cryptographic scheme. A biometric electronic template is generated based on the digitized biometric signature. The cryptographic key and the biometric electronic template are stored in the memory.

Generating cryptographic keys can include generating a prime parameter, a sub-prime parameter, and a base parameter. A signing private key is generated. A signing public key is generated based on the prime, sub-prime, and base parameters. A user public key is generated based on the signing private key and the prime and base parameters. The prime, sub-prime, and base parameters, and the signing private and public keys, are stored in the memory.

Alternatively, generating cryptographic keys can include generating keys according to a symmetric constructive key management scheme. In this case, the symmetric constructive key management scheme can utilize, for example, credentials and only a random number key split.

The user interface can also include a password input device, in which case the method also includes receiving a user password via the password input device. A password encryption key is generated based on the user password. A known value is encrypted with the password encryption key to produce an encrypted output. The encrypted known value is stored in the memory. For example, the known value can be the biometrics electronic template.

Receiving the digitized biometric signature can be repeated at least once.

Receiving the digitized biometric signature and generating the biometrics electronic template can be repeated at least once.

The biometric electronic template can be generated based on a mathematic transformation of the digitized biometric signature. For example, the mathematical transformation can be a Fourier transformation.

The electronic signature device can be communicatively connected to a certificate authority via the device interface, in which case the method also includes sending a certificate request to the certificate authority.

A certificate package is received from the certificate authority, and the certificate package is stored in the memory. For example, the certificate package can include a digital certificate. Alternatively, the certificate package can include a digital certificate and a root value.

The device interface can be a card interface.

The electronic signature device can also include a power source that is a battery and/or the computer interface.

The first signature input device can be integral with the electronic signature device.

The first signature input device can be connected to the bus(es) through the device interface.

At least a portion of the user interface can be integral with the electronic signature device.

At least a portion of the user interface can be connected to the bus(es) through the device interface.

The method can also include printing a graphic indicium that is based at least in part on the digitized biometric user signature of the user, the cryptographic key, and/or the biometric electronic template. For example, the graphic indicium can be a bar code.

According to another aspect of the invention, an electronic signature device includes a processor, a memory having a biometric electronic template stored therein, a user interface including a biometric signature input device, a device interface adapted to interface a computer, and at least one bus operably connected to the processor, the memory, the user interface, and the device interface. A method of originating an electronically signed transaction includes verifying whether a user is permitted to originate the electronically signed transaction with the electronic biometric signature device, by receiving a digitized biometric originator signature via the user interface, and comparing the digitized biometric originator signature against the biometric electronic template to produce a first verification result. A transaction package is received through the user interface or the device interface. The transaction package, and the digitized biometric signature or a digitized biometric user signature extracted from the biometric electronic template, are combined to produce an originator biometric signature block. A cryptographic key is generated. The originator biometric signature block is encrypted with the cryptographic key to produce an encrypted biometric signature block. The encrypted biometric signature block and the cryptographic key are combined to produce an electronically signed transaction. If the user is verified, the electronically signed transaction is provided via the device interface.

The memory can also store a biometric electronic template, a prime parameter, a sub-prime parameter, and a base parameter, user public data including a user public key, and a user private key. In this case, generating a cryptographic key can include generating an ephemeral private key based on the prime, sub-prime, and base parameters. An ephemeral public key is generated based on the ephemeral private key and the prime and base parameters. A shared encryption key is generated based on the ephemeral public key, the user public key, and the prime parameter. The cryptographic key is a shared encryption key. The ephemeral private key, the prime parameter, and at least a portion of the user public data are combined with the encrypted biometric signature block and the cryptographic key to produce the electronically signed transaction.

Alternatively, generating a cryptographic key can include generating a key according to a symmetric constructive key management scheme. In this case, the symmetric constructive key management scheme utilizes credentials and only a random number key split.

The user interface can also include a password input device, and the memory can also store an encrypted known value. In this case, verifying whether the user is permitted to originate the electronically signed transaction with the electronic signature device can also include receiving a user password via the password input device, generating a password encryption key based on the user password, and decrypting the encrypted known value with the cryptographic key to produce a second verification result. For example, the encrypted known value can be the biometrics electronic template.

Receiving the digitized biometric originator signature can be repeated at least once.

Receiving the digitized biometric originator signature and comparing the digitized biometric originator signature against the biometric electronic template to produce the first verification result can be repeated at least once.

Comparing the digitized biometric originator signature against the biometric electronic template can include generating a temporary template based on the digitized biometric originator signature, and comparing the temporary template to the biometric electronic template. In this case, the temporary template can be generated based on a mathematic transformation of the digitized biometric originator signature. For example, the mathematical transformation can be a Fourier transformation.

Comparing the digitized biometric originator signature against the biometric electronic template can include generating a temporary biometric signature based on the biometric electronic template, and comparing the temporary biometric signature to the digitized biometric originator signature. In this case, the temporary biometric signature can be generated based on a mathematic transformation of the digitized biometric originator signature. For example, the mathematical transformation can be a Fourier transformation.

The method can also include printing a graphic indicium that is based at least in part on the digitized biometric user signature of the user, the cryptographic key, and/or the biometric electronic template. For example, the graphic indicium can be a bar code.

These, and other, features and advantages of the invention will be apparent from the accompanying drawings and the detailed description that follows.

DETAILED DESCRIPTION OF THE INVENTION

Figure 1:
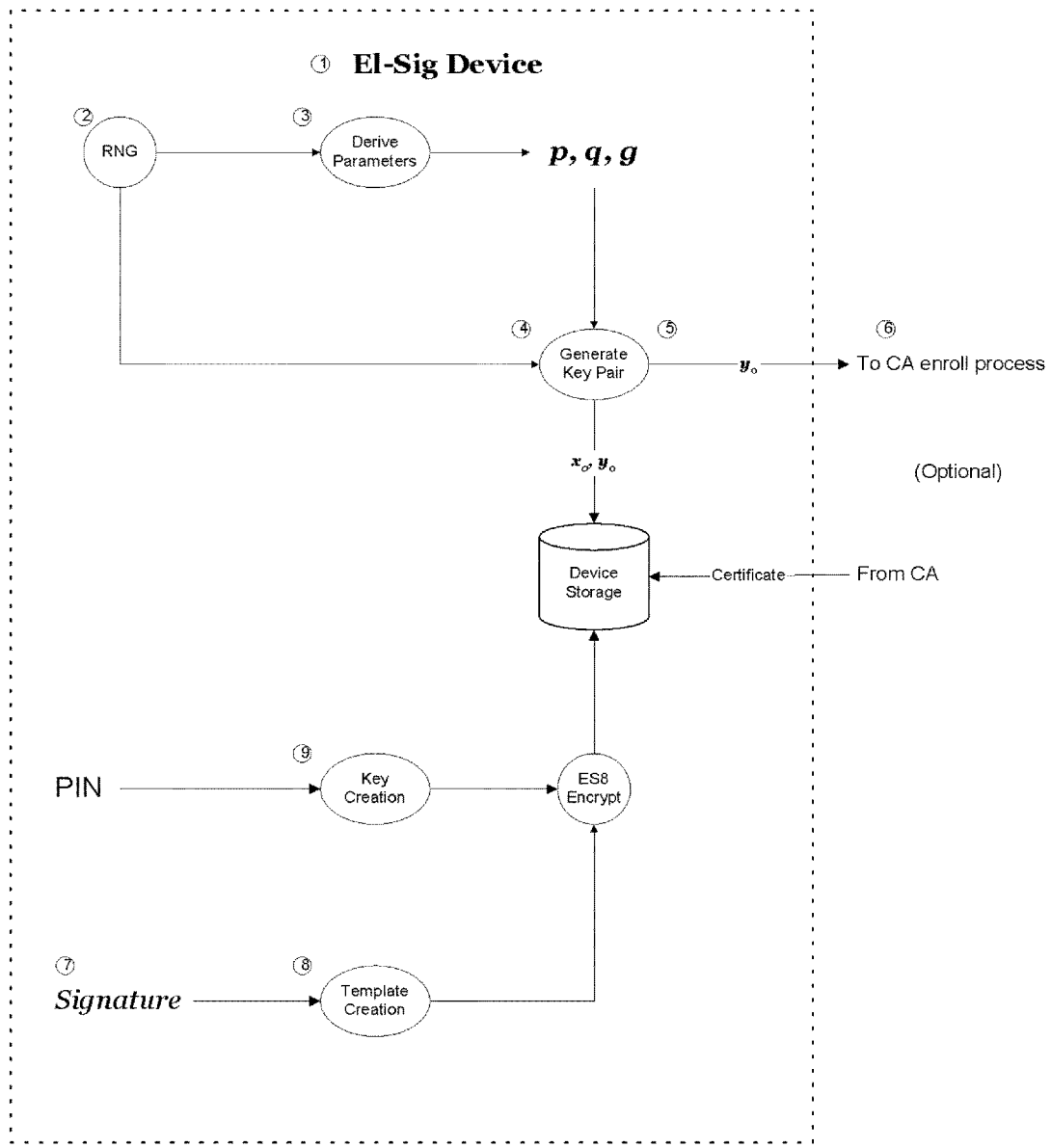
FIG. 1 shows an exemplary personalization process according to the invention.

The present invention is described in further detail, including reference to exemplary embodiments shown in the accompanying figures. The exemplary embodiments are only presented to facilitate disclosure of the invention, and do not limit the inventive concept to any particular feature, order of actions, aspect, feature, or embodiment disclosed.

Terminology

As used herein, the following terminology shall have definitions that are set forth below.

1. The term document means any communication, written or otherwise fixed in a tangible medium, whether on paper, stored or transmitted digitally as ASCII, word processing, or other type of data, stored or transmitted digitally as a graphic file, or stored or transmitted as a fax. Thus, document can include a conventional paper document, a digitized version of a paper document, or an electronic file that never existed as a paper document. For example, an electronic application package, an instance of an electronic transaction between parties, or any other electronic form would be considered to be a document in the context of the present invention.

2. The term signed document means a document accompanied by a biometric signature.

3. The term biometric signature means a biometric identifier provided by the originator of the signed documents. This biometric signature can be provided on paper; stored or transmitted digitally as a graphic file, such as a bitmap, jpeg, gif file, or tiff file (this will be called a GROBS (Graphic Representation Of a Biometric Signature)); or stored or transmitted digitally as a vector file, which contains more information pertaining to the creation of the signature than does the graphic file (this will be called a DROBS (Digital Representation Of a Biometric Signature)). For example, if the biometric signature is a conventional hand-written signature, the vector file can include such information as the direction of travel from a point and speed at any given point in hand-writing the signature.

4. The term authentic means that the identity of the person claiming origination of a document is, in fact, the claimed identity and that the person is not an imposter (origin authentication); a document has not been altered, either maliciously or accidentally, from its original form (message integrity); and the originator cannot deny creation or transmission of the document (non-repudiation).

5. The term mathematically bound means that a value has been provided with the bound elements which has been calculated from all of those elements, and that there is only a very small probability (for example, on the order of $2^{-80}$, or approximately $10^{-24}$, or less) that this value could have come from other than all of the bound elements. The bound elements can be stored or transmitted digitally or able to be entered into a computer for performing the calculation of the above value.

6. The term El-Sig document means a document accompanied by a graphic representation of a biometric signature (GROBS) and an El-Sig block.

7. The El-Sig block is a set of data that is digitally encoded. The encoding can be stored and/or transmitted electronically or it can be printed on a written document in bar-code form or other graphic form. The El-Sig block can include the user's ID and public signing key or the user's digital certificate; a digital signature on the document and GROBS; the static or watermarked (in an optional watermark embodiment) GROBS; the encrypted digital signature and DROBS (in an optional biometric embodiment); the key of the previous step encrypted with a user encryption key (in an optional biometric embodiment); the initialization vector (IV) used to encrypt the digital signature and DROBS (in an optional biometric embodiment, optional because the encryption algorithm might not require an IV); the notary's ID and public key or the notary's digital certificate (in an optional notarial embodiment); and the notary's digital signature on the GROBS (in an optional notarial embodiment).

8. The term user is the first-party or originator of the El-Sig document.

9. The term recipient refers to the second party or the recipient of the El-Sig document. The recipient can use the graphical representation of the biometric signature as attesting to the authenticity of the document, as with, for example, a conventional written signature. The recipient can also gain greater assurance in the document's authenticity by performing the electronic verification process on the El-Sig document.

As will be appreciated by those of the skill in the art, a GROBS does not provide sufficient information to compute meaningful biometrics scores against a biometric signature template. It cannot be used to generate a DROBS that successfully verifies against the biometrics template belonging to the user's biometric signature. More technically, the group of DROBS that can be generated from the GROBS will produce false-accept rates for biometric matching against a known template less than 0.01 percent of the time, according to the ANSI X9.84 standard. However, a DROBS does provide sufficient information to compute successful biometrics scores against a biometric signature template.

It is assumed that parties utilizing the present invention will ensure that certain elements, such as the private part of the user's El-Sig signing pair key, the user's El-Sig encryption key, and the user's biometrics signature template, are secured. That is, it is up to the respective parties to ensure that measures are taken to keep keying material and other sensitive data confidential, if the parties want to enhance the security of communication or transaction. Physical and cryptographic measures can be used by the parties to this end, but such techniques are not part of the scope of this document.

The method of the present invention begins with actions taken by an originator of a document, who will be referred to herein as a user. Optionally, the method can involve a recipient, who in some cases cannot be identified. According to an optional notarial embodiment of the present invention, a third-party can also be involved. The third-party acts as a notary and attests that he or she witnessed that a biometric signature was executed by the user. The third-party will have (or will be provided with) the necessary hardware and software for converting a biometric signature into an electronic form for use by a digital computer. The hardware can include an appropriate scanner, such as a fingerprint reader, retinal scanner, or other biometric input device, a PDA utilizing a pen stylus, or a graphics tablet, and the software can include any that is appropriate for the chosen hardware device.

Accordingly, the identity of the originator, or the UID, can be used by the method of the present invention. This UID can be, for example, an e-mail address, a distinctive name, computer user account, or some other identifying feature of the user. The identity can be relative to the third-party, if present. The identity of the recipient is optional. If utilized, the actual form of the recipient ID can be different from the UID. For example, a UID can be a distinctive name, whereas the identity of the recipient can be an e-mail address. According to the notary option, the identity of the notary third-party can be utilized. Accordingly, a self-escrow ID can appear as a third-party ID.

The method of the present invention is utilized in conjunction with a document, or with certain portion(s) of the document. The document, or the selected portion(s), is bound to the graphical representation of the user's biometric signature.

According to an optional biometric embodiment of the present invention, a vector representation of the user's biometric signature (DROBS) is created using a biometric vector-capturing device. The device used to accept the biometric signature (for example, a graphics tablet, fingerprint reader, or retinal scanner) is attached to a computer. Software on the computer can translate, store and use the data from this device. The terms "computer" and "computing device", as used herein, broadly cover any class of computing device, including, for example, any apparatus that includes a microprocessor and that can process instructions necessary to carry out the method of the invention.

A graphic representation of a biometric signature (GROBS) can be created directly from the DROBS or from a captured signature. As noted previously, the DROBS cannot be created from the GROBS. The GROBS can take the form of a bitmapped file or gif file, for example, and can be displayed to show the signature on a computer monitor or printed hard copy. An El-Sig block is created from at least the document and the GROBS. Optionally, a printed version of the document, biometric signature, and El-Sig block can be provided, although it could be the case that all of these elements exist only in electronic form.

A bar-code print, or other printed graphic indicium, of the El-Sig block can also be provided. When no hard-copy printout of the El-Sig document exists, the data in the El-Sig block exists electronically and the bar code graphic can still accompany the El-Sig document.

A cryptographic hash algorithm can also be used in the method of the present invention. Although any known algorithm can be used, the cryptographic strength of this algorithm affects the overall security of the method. An exemplary algorithm is the U.S. Secure Hash Algorithm (SHA-1), as described inn FIPS PUB 180-1.

A cryptographic asymmetric-key digital signature algorithm can also be used in the method of the present invention. Although any known algorithm can be used, the cryptographic strength of this algorithm affects the overall security of the method. An exemplary algorithm is the U.S. Digital Signature (DSA), as described in FIPS PUB 186.

A cryptographic symmetric key, asynchronous stream encryption algorithm can also be used in the method of the present invention. A block cipher can be utilized as long as it is used in an asynchronous streaming mode, for example, cipher feedback mode. Although any known algorithm can be used, the cryptographic strength of this algorithm affects the overall security of this method. An exemplary algorithm is the U.S. Advanced Encryption Standard algorithm, also known as Rijndael, used in cipher feedback mode.

A symmetric Constructive Key Management (CKM) model can also be used in the method of the present invention, as an alternative to the public key model. CKM is an American National Standards Institute (ANSI) standard, described at ANSI X9.69, X9.73, X9.84, and X9.96, as well as in, for example, U.S. Pat. Nos. 6,490,680; 6,542,608; 6,684,330; and 7,111,173, all of which are incorporated herein by reference. The public key model can be effective for use with two-dimensional bar codes, but is inefficient for use with a one-dimensional bar code. In practical application, the U.S. Postal Service uses a two-dimensional bar code, but one-dimensional codes are still a mainstay for many other commercial applications. The symmetric model can be adjustable to accommodate 10 or 20 bytes that show up in one-dimensional codes. The $P^2$ algorithm described, for example, in U.S. Pat. No. 6,266,417 (incorporated herein by reference) can be used as the encryption algorithm, and a minimal version of CKM (credentials and a random number; could also include a maintenance vector if network level key updates are required) can be used for key management. For brevity, only a public-key scheme is described herein in detail. It will be apparent to those of skill in the art, however, that a symmetric CKM scheme can be substituted for the public-key scheme as appropriate.

A cryptographically strong random number generator (RNG) or pseudo-random number generator (PRNG) can also be used in the method of the present invention. Many generators utilizing different algorithms are known to those of skill in the art. An exemplary algorithm is described in Appendix 3 of FIPS PUB 186.

According to an optional watermark embodiment of the present invention, a watermark algorithm can be utilized. Preferably, this algorithm should be persistent, that is, attempts at altering the watermark should leave traces of the watermark sufficient to recover data within the watermark. This option is most advantageous if the notary option is not used.

There are many applications for use of the present invention. For example, the present invention can be used when a user writes a personal check to a second party. In this exemplary application, the third-party can be the user's bank, and the UID can be the user's account number. Key elements of the transaction can include the date, the amount of the check, an identifying bank number, the user's account number, a check number, and the identity of the recipient. The check can be printed from a computer, and the barcode can be printed on the check. The recipient is the party to whom the check is made out. Alternatively, the bank can be the first party, and the recipient the second party. The national bank number would then be the UID. The account number on the check would be included as one of the key elements.

Another exemplary application is one in which a user purchase a money order from a bank to send to a second party. In this example, the third-party is the user's bank, and recipient identification is optional. Key elements of the transaction can include the date, the amount of the money order, the bank number, and money order number. The money order can be printed from a computer such that it includes a barcode. As with the personal check example, the bank can instead be the first party, the recipient being the second party. The person who sends the money order would be just an agent in the process.

Another exemplary embodiment is one in which a graduate receives a diploma from college. The user in this example is the dean (or whoever signs the diploma), the recipient is the graduate, and the third-party is the college or a university accreditation facility. Key elements could include the name of the college, the date, the degree type (for example, bachelor of science), the subject area (for example, electrical engineering), and the name of the dean (or the signor of the diploma). The diploma can be printed from a computer and bar-coded.

Other exemplary applications include Uniform Commercial Code contracts, bonded warehouse seals, bills of lading, evidence tags, verification for financial instruments, legal agreements, signed, sworn, or notarized documents, drug prescriptions, medical order verification, purchase orders, work orders, change orders and the like, evidence tags, airline baggage tags, high-value inventory verification, bonded warehousing, shipping seals for packages and trunks, labels for high-value parts subject to counterfeiting, identification cards, and professional certificates.

Exemplary Embodiment

In a particular embodiment of the present invention, the method includes three main actions: 1) initialization of the user and possibly enrollment with the third-party entity; 2) user preparation of the document and transmission thereof; and 3) recipient verification of the user's biometric signature. A forth action, namely, resolution of a dispute, can be utilized, for example by third-party verification of the user's biometric signature.

As shown in FIG. 1, initialization includes the creation and storage (and escrow) of cryptographic keys and a biometric signature, that is, a biometric sample. This includes generating a user El-Sig signing key pair. If, for example, this key pair is a DSA key pair then parameters, namely, p, q, and g, will be also generated. The user's El-Sig encrypting key, for example, a symmetric cryptographic algorithm key, is then generated. Alternatively, the key pair can be an asymmetric cryptographic algorithm key pair.

According to the biometric embodiment, a biometrics template is created. This is effectuated by the user's providing a biometric sample using a sampling device, preferably several times. For example, a user can write his or her signature using a hand signature-capturing device; can provide a fingerprint sample using a fingerprint reader; or can provide retina map data using a retina scanner. Any biometric event that provides a unique biometric sample corresponding to the user can be used to provide the biometric signature, either alone or in combination with other types of biometric signatures. Conceptually speaking, the algorithm for generating the template will combine all instances of these biometric signatures and create the template from some composite of these measurements. The GROBS then can be generated from the DROBS, if the biometric option is utilized, or by simply scanning a hand-written signature in any case.

If the notary option is utilized, a notary third party creates a digital signature based on the GROBS and the UID.

Certain personal data for the user, such as the UID, is stored, according to this exemplary embodiment, as the user's personal El-Sig data. The user's El-Sig signing key pair (and parameters, if any) are stored and, with the UID can be combined into a digital certificate. The signor of this certificate could be a well-known certificate authority. It can also be a notary, if used, or can be self-signed by the user. The ISO X.509 standard for digital certificates is an example by which the certificate can be created. Certificate extensions or attribute certificates can accompany this certificate. For example, use of this signing key pair limited for El-Sig purposes can appear as an attribute certificate. The GROBS of the user's hand-written signature can also be stored.

According to an optional biometrics embodiment, the user's El-Sig encryption key and biometrics template can also be stored. According to an optional notarial embodiment, identification of a notary third-party and the notary's verification public key can be stored, and can be combined into a digital certificate. The ISO X.509 standard for digital certificates is an example by which the certificate can be created. A digital signature on the GROBS and UID by the notary can also be stored, according to this optional embodiment.

In order to store the El-Sig encryption key and private part of the signing key pair securely, encryption with a password-generated key, for example, can be performed by the user. Alternatively, or in addition to this, the hand-written biometrics verification process can serve as the user identification mechanism that grants authorization to use this personal data. Holding the El-Sig encryption key and private part of the signing key pair on a token that can be carried by the user can also add strength to the security. Examples of such a token include smart cards and USB key fobs.

The confidentiality of this personal data can also be strengthened cryptographically by binding a randomly-chosen cryptographic key value with the biometrics template. This cryptographic key is used to encrypt the rest of the personal data. However, it is preferable that the key value is not able to be deduced from the biometrics template alone; only a biometrics measurement that successfully matches against the template should allow release of the random key value. A means to periodically change the password and/or cryptographic key can be utilized to maintain a prudent level of security.

If the notary option is used, initialization should take place in-person with the notary. Official documents establishing a person's identity (for example, a birth certificate, passport, or driver's license) can be used for stronger binding of a person's identity.

Figure 2:
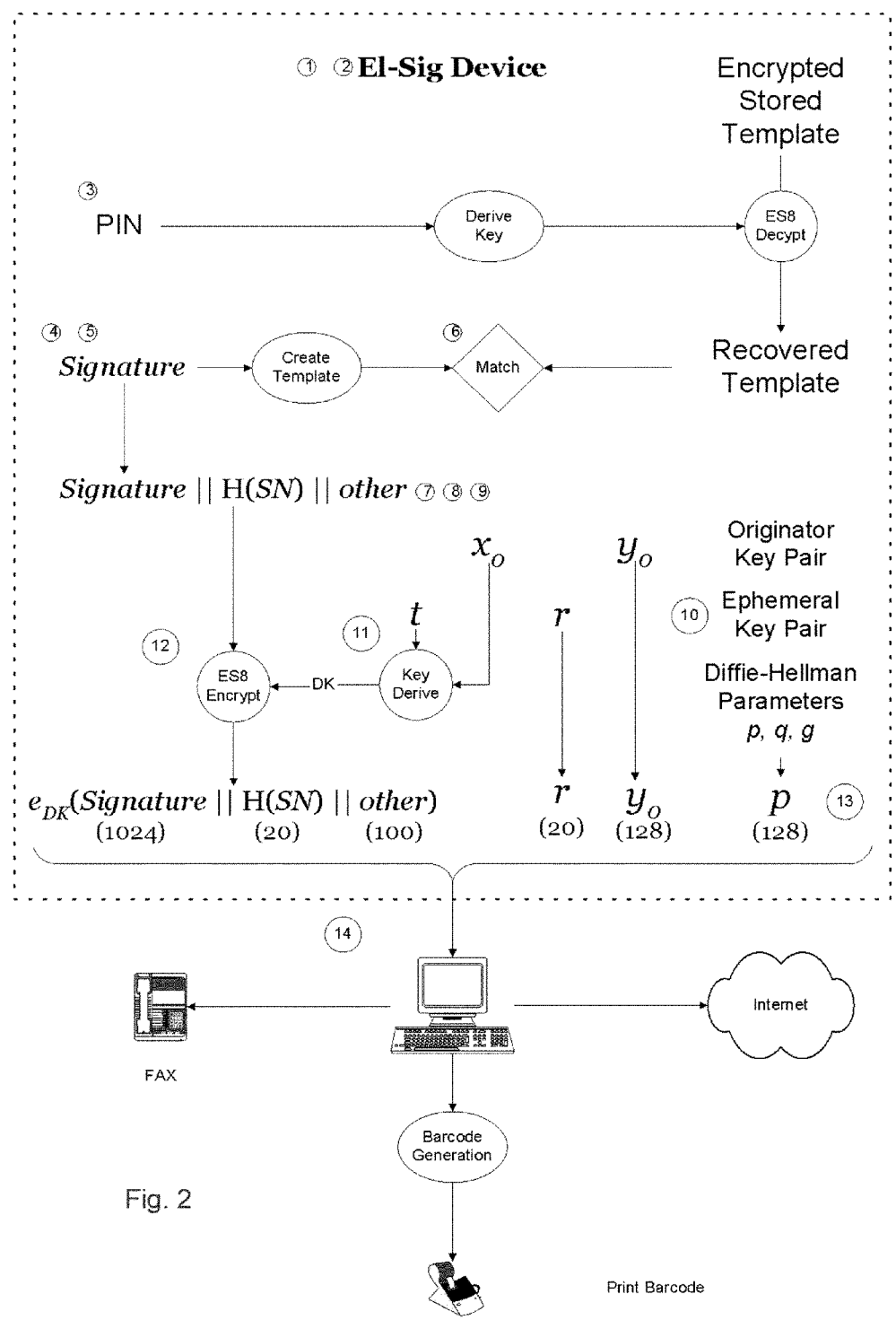
FIG. 2 shows an exemplary origination process according to the invention.

As shown in FIG. 2, the exemplary process of creating an El-Sig document utilizes a computing device, appropriate software, the user's personal El-Sig data, and, optionally, biometric signature-capturing hardware, such as a graphics tablet, fingerprint reader, or retinal scanner, that is connected to the computer. The user retrieves his or her El-Sig data. If the data is held on a token, the token is presented. If a password-generated key was used to encrypt this data, the correct password is entered.

If, for example, hand-written biometrics verification is used to grant access to this data, the user writes his/her signature on the hand-written signature capture device. The hand-written signature is digitized, creating a DROBS for this El-Sig document. If any other type of biometrics verification is required to grant access, an appropriate biometrics measurement is produced. According to the biometrics option, the DROBS and biometrics template are matched. If the match is not successful, the process shuts down, or a predetermined number of retries can be allowed. If the predetermined number of retries is exceeded without success, the process shuts down. If a cryptographic key that is needed to decrypt the user's El-Sig personal data is bound to the biometrics template, this key value can now be retrieved from the template and used to decrypt the personal data.

The user or the application software identifies the key elements of the document that are to be used by the El-Sig process. Optionally, the user can identify the recipient of the El-Sig document. The key elements of the document, the recipient ID (if provided), and the GROBS are concatenated or otherwise combined, and hashed according to the cryptographic hash algorithm. If the watermark option is utilized, the GROBS is watermarked with the hash value. Preferably, the watermark option is only utilized if the notary option is not utilized.

A digital signature using the user's El-Sig private signing key is created using the key elements of the document, the static or watermarked GROBS, and the recipient's ID (if provided).

If the biometrics option is utilized, the digital signature and DROBS are concatenated or otherwise combined, and then encrypted with a randomly-generated key (CEK). The CEK is encrypted with the user's El-Sig encryption key. If the encryption algorithm is a block cipher used in a streaming mode, such as a cipher feedback mode, then an initialization vector (IV) will be generated randomly with the CEK.

The El-Sig block is then created. According to this exemplary embodiment, it includes the user's identity, and the public part of the user's El-Sig signing key pair or the user's El-Sig digital certificate, as well as the digital signature and the static or watermarked GROBS, and the recipient's ID, if provided. If the biometrics option is utilized, the El-Sig block can also include one or more of the encrypted digital signature and DROBS, the encrypted key (encrypted CEK), and the IV used to encrypt the signature and DROBS (if generated). If the notary option is utilized, the El-Sig block can also include one or more of the notary's ID and public key or the notary's digital certificate, and the notary's digital signature and GROBS and user ID.

The El-Sig block can then be converted to a barcode format such as, for example, the PDF417 format. The El-Sig block and the static or watermarked GROBS are then appended or otherwise attached to the original document to create an El- Sig document. In electronic form, the El-Sig block can appear twice—once in digital form, and once in graphic, barcode form.

Optionally, a paper copy (for example, for postal mailing or faxing) of the El-Sig document can be created. In this case the El-Sig document is printed with a graphics capable printer (for example, a dot-matrix, laser, or ink jet printer). The El-Sig block is represented in bar code format on the printed document, and the GROBS is printed in the graphics form as a printed document.

Figure 3:
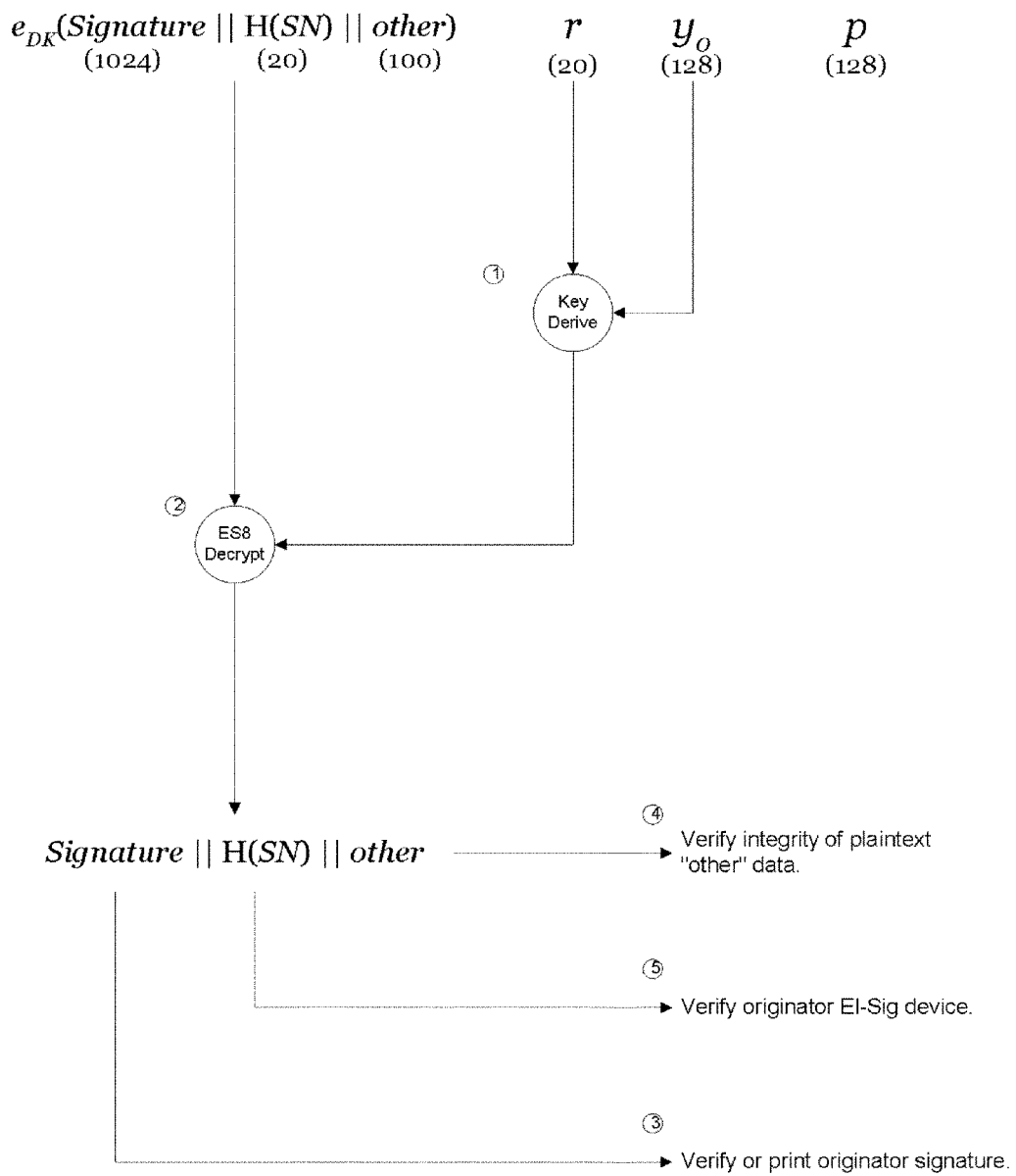
FIG. 3 shows an exemplary recipient process, for origin authentication, according to the invention.

As shown in FIG. 3, full verification by the recipient of an El-Sig document according to the exemplary embodiment is performed by a recipient using a computing device. If the El-Sig block includes a bar-code, the computing device includes a bar-code reader. The process of authentication can be applied upon receipt of the El-Sig document, or any time afterwards.

By analogy, the recipient can treat the GROBS like a stamped hand-written signature. The recipient retrieves the digital form of the static or watermarked GROBS, the originator's digital signature, and the originator's public key from the El-Sig bloc. If the El-Sig document is in electronic form, the El-Sig block is merely read from data. If the El-Sig document is in paper form, the El-Sig block is entered into the computer using a bar-code reader. According to this hardcopy option, the GROBS from the El-Sig document is displayed on the computer monitor and can be visually compared to the written signature on the paper document.

The digital signature (from the El-Sig block on the key elements of the document, the GROBS and, optionally, the recipient's identity) is verified using the public key from the El-Sig block. If the notary option was utilized by the user, the notary's public verification key and digital signature on the GROBS is retrieved from the El-Sig block, and the notary's digital signature on the GROBS and user's ID are verified.

The second-party verification process gives some assurance to the recipient that the document is authentic if the originator's digital signature verifies. Further, the El-Sig document has a biometric signature (the GROBS and optionally the printed biometric signature), and the biometric signature on the paper and the GROBS are bound (in a paper El-Sig document) by the visual comparison of the biometric signature and GROBS. The document and GROBS also are bound by the originator's digital signature. In addition, if the notary option is utilized, the identity of the user and the GROBS are bound by the digital signature of the notary on the GROBS and the user's identity.

The process is resistant to counterfeiting of the written signature by the recipient, because the GROBS cannot be used to deduce the DROBS. Further, a user digital signature and the GROBS with the document that it is being applied to backs up the biometric signature. Also, a counterfeiter cannot reproduce the user's private key, which preferably is kept confidential.

If the watermark option is utilized, the GROBS is watermarked. If a strong watermark process is used, the watermark cannot be erased from the watermarked GROBS, so a would-be counterfeiter cannot remove it. Furthermore, the watermark is either a digital signature that the recipient cannot reproduce, or it is the recipient's ID, which points directly to the counterfeiter if counterfeiting is attempted.

The DROBS, if used as part of the biometrics option, is encrypted with a key that is unknown to the recipient, as an additional measure to thwart counterfeiting.

If the second-party verification fails, the recipient can treat the El-Sig document as not authentic. If the second-party verification is successful, but the recipient still requires greater assurance or disputes the verification result, the other elements of the El-Sig block can be used.

Biometrics verification can be used to provide further evidence of intent to sign. The El-Sig document and the originator are needed to perform this verification. The user's El-Sig encryption key is used to recover the CEK from the El-Sig block. The CEK and the optional IV (if provided) are used to decrypt the encrypted digital signature and DROBS. The decrypted digital signature is verified with the document (or predetermined key elements of the document) and GROBS and, optionally, the recipient's ID. The DROBS then is verified against the user's biometrics template. The successful verification of these steps provides additional proof of the authenticity of the El-Sig document.

Assurance is stronger than that of second-party verification because only the originator can create a DROBS that verifies successfully with the copy of the biometrics template. Further, only the originator has access to the biometrics template that the DROBS successfully matches, and only the originator and the third-party know the key used to encrypt the digital signature and the DROBS.

As previously noted, third parties are not a necessary part of the process of the present invention, but can be utilized if desired by the originator or recipient. For example, a notary third party can be used, as discussed above. Basically, the notary simply attests to witnessing generation of the biometric signature of the user. The binding of the user's identity and biometric signature can be made stronger when the notary inspects documents supporting the identity of the user.

Also as previously discussed, public keys and identities used for digital signatures can be put onto a certificate. These certificates can be self-signed, or can be signed by a recognized certificate authority as a third party to the process. It is also possible to use certificates that have already been generated from within a PKI.

In addition, trusted third parties can be used to escrow the user's El-Sig encryption keys and biometrics templates. They will be called upon to do biometrics verification, taking the place of the user. The keys and templates that are escrowed need not be revealed to any other party and preferably remain confidential.

As an additional feature, multiple El-Sig signatures and El-Sig blocks can be added to an El-Sig document that has already undergone the process of the present invention. Subsequently added El-Sig blocks are based on the document, or key elements thereof, and the subsequent signer's GROBS and personal data. The first signer's data is not necessarily a key element for additional signatures. Also, a witness can add his/her El-Sig signature and El-Sig block. In this case, the El-Sig block is created from the witness's personal data and the original signer's El-Sig block, and is not based on the document itself.

General Aspects of the Invention

Initially, it should be noted that the description of the invention makes reference to cryptographic, hashing, and digital certificate schemas. For purposes of illustration, particular schemas will be presented by way of example, and are not limiting of the invention. For example, the U.S. Secure Hash Algorithm ("SHA-1", See FIPS PUB 180-1) will be described when a cryptographic hash algorithm is to be used in connection with the invention. Likewise, a cryptographic asymmetric key digital signature algorithm used in connect with practicing the present invention can be the U.S. Digital Signature Algorithm ("DSA", see FIPS PUB 186); a cryptographic symmetric key encryption algorithm can be a cryptographic symmetric key asynchronous stream encryption algorithm, such as the U.S. Advanced Encryption Standard algorithm (a.k.a. RIJNDAEL used in CFB mode), or a block cipher used in an asynchronous streaming mode, such as cipher feedback; a random, or pseudo-random, number generator can be that provided in Appendix 3 of FIPS PUB 186; and a digital certificate schema can be used on the ISO X.509 standard. All of these exemplary schemas can be replaced by suitable equivalent schemas, within the spirit and scope of the present invention.

Initializing a User

In an exemplary aspect of the invention, a method of electronically signing a document includes initializing a user and providing an electronic signature for a recipient. According to the present invention, initializing a user can include generating an asymmetric key pair including a private signing key and a public signing key, and storing the private signing key and the public signing key.

An asymmetric key pair can be generated based on any asymmetric cryptography schema functionally compatible with the present invention, and can be generated randomly or pseudo-randomly. For example, and asymmetric key pair can be generated based on the U.S. Digital Signature Algorithm ("DSA"), which initially requires keying data. Accordingly, prime (p), sub-prime (q) and base (g) parameters can be initially generated randomly or pseudo-randomly, and thereafter used to generate a private signing key. The private signing key and the prime (p) and base (g) parameters are used to generate the corresponding public signing key.

A user provides at least one biometric signature via a signature input device (for example, a digitizing tablet), which captures each biometric signature as signature data. Signature data can include vector data, which can include or define, for example, details regarding the capture of the biometric signature. A user can opt, or be required, to provide further plural biometric signatures, of the same type or different types. For example, to account for the variable nature in handwriting signatures, plural handwritten signatures provide plural instances of signature data, which can be analyzed to provide an average, composite, or most representative instance. As another example, a fingerprint scan might be required in addition to a hand-written signature. Further, plural instances could also provide additional data, such as, for example, tendencies, habits, likely variations, unlikely variations, acceptable margins of error, etc., which can be utilized during the optional user authentication check, as discussed below (for example, for verification key generation or biometric template comparison).

The private signing key, the public signing key and the document data can be stored for subsequent use.

Providing an electronic signature includes receiving document data corresponding to at least one selected portion of the document, binding the stored private signing key, the stored signature data, and the document data to create an electronic signature, and providing the electronic signature for a recipient.

Document data corresponds to at least one selected portion of the document to be electronically signed. Portions of the document are selected by the user, by a recipient, by the user and the recipient, by an authority, or according to a protocol or custom. A selection protocol can select all portions each time.

Binding a private signing key, the signature data, and the document data to produce an electronic signature includes creating the electronic signature based on at least a portion of each of the private signing key, the biometric signature data, and the document data in a manner that will reliably re-create the electronic signature given the same private signing key, biometric signature data, and document data. Binding can be one-way (that is, not having an inverse), or two-way. Binding can be based on at least one cryptographic schema (that is, an asymmetric cryptographic algorithm, a hash algorithm, etc.).

The electronic signature is provided in a manner compatible with the recipient. A compatible manner includes a digital form, readable by the recipient. The electronic signature can be provided in digital form (for example, on a computer-readable medium, through a network to a computer-readable medium, etc.) and then provided for a recipient. The electronic signature can be provided in a computer-readable form.

For example, the signature data and the document data can be concatenated, and then encrypted based on the private signing key.

Further, optionally, at least a portion of the user data can be utilized to authenticate the user's identity through cryptographic and/or biometric means before permitting the user to electronically sign a document, which also heightens a recipient's level of trust in the reliability of the electronically-signed document.

An electronic biometrics template can include biometric data corresponding to the at least one handwritten signature or other biometric event. Additionally, or alternatively, an electronic biometrics template can include data generated based on a mathematical transformation (for example, a Fourier transformation, a mathematical transformation, etc.) of the digital signals, in whole or in part.

A graphical representation can be graphically-formatted data, from which a graphical representation of a handwritten signature can be reproduced. For example, a graphical representation can be provided in the Graphics Interchange Format ("GIF"), Tagged Image File Format ("TIFF"), etc.

According to another exemplary aspect of the invention, initializing a user can also include generating a user cryptographic key and/or receiving a user ID, and storing the user cryptographic key and/or user ID. A user cryptographic key can be used for subsequent purposes as further described herein, and can be based on a symmetric cryptographic scheme. Notably, however, a user cryptographic key can be based on an asymmetric cryptographic scheme to the extent desired and consistent with the present invention as described herein. A user ID can be a unique identifier, such as, for example, an e-mail address, a social security number, a driver's license number, a legal name, and/or a mailing address.

According to a further exemplary aspect of the invention, initializing a user can also include providing a notary request to a notary entity, receiving a notary response including a notary digital signature on at least a portion of the notary request, and storing at least a portion of the notary response.

Illustratively, a notary request can include at least one of the private signing key, the public signing key, at least one cryptographic parameter, a user ID, a graphical representation, and other data to the extent desired.

On the receipt of a notary request, a notary entity can digitally sign at least a portion of the notary request, and provide a notary response including the notary digital signature. For example, a notary can digitally sign the graphical representation and the user ID. Additionally, or alternatively, a notary response can include at least one of a notary public key, a notary ID, a notary digital certificate including the notary public key and the notary ID, and a user digital certificate including one or more of the data included in the notary request (for example, the user ID, the user public signing key, and the at least one cryptographic parameter).

Optionally, before providing the notary response, a notary entity can require the user to provide (optionally in-person) trusted identification supporting the user's identity, such as, for example, a passport or a driver's license.

According to another exemplary aspect of the invention, initializing a user can also include generating a verification key, encrypting, based on the verification key, at least one of the private signing key, the public signing key, at least one cryptographic parameter, a user cryptographic key, a user ID, an electronic biometrics template, a graphical representation, and at least a portion of a notary response, storing the respective encrypted user data, and optionally, binding the verification key with at least the electronic biometrics template.

A verification key can be generated in any repeatable manner, such that the same verification key can be subsequently generated given the same conditions. Illustratively, a verification key can be generated randomly or pseudo-randomly. Further, a verification key can be bound to the user's electronic biometrics template, and optionally, other data (for example, other provided or generated data, other user data, a user password, etc.) to provide further binding of the user to the user data.

According to another exemplary aspect of the invention, generating a verification key can include receiving a user password from the user, and generating, based on the user password, the verification key. A user password can be any type of data that can be consistently provided by a user, such as, for example, alphanumeric data, symbolic data, biometric data, or a handwritten signature. Further, a verification key can be generated from a user password in any repeatable and consistent manner, such that the same verification key can be generated substantially each time, given the same user password.

According to another exemplary aspect of the invention, a user password includes biometric data, and generating a verification key includes generating a plurality of cryptographic key splits from seed data and randomizing the cryptographic key splits to produce the verification key. Generating a plurality of cryptographic key splits includes generating a biometric key split based on the user password.

Figure 4:
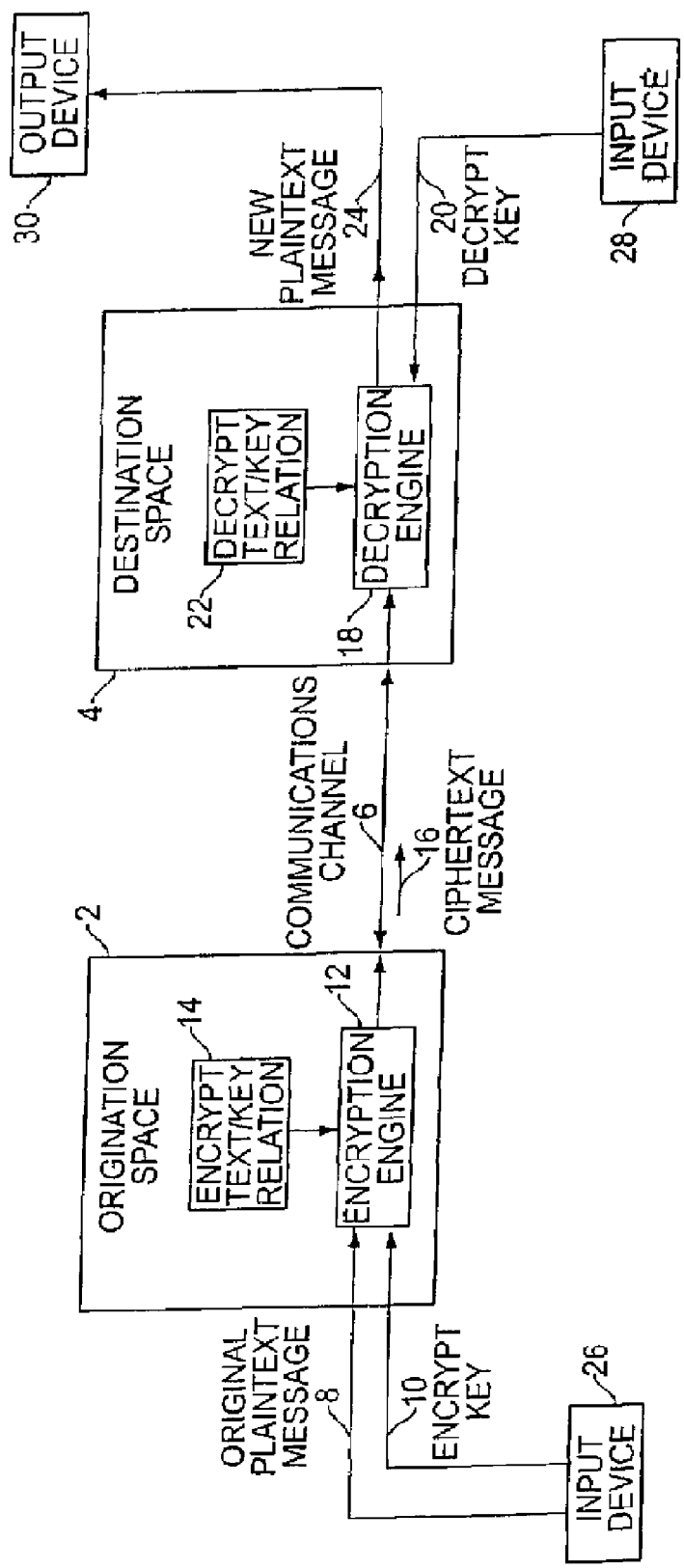
FIG. 4 is a block diagram of a communications event featuring cryptography.

A key split combiner or binder method can be utilized as follows. Referring to FIG. 4, a communication has an origination space 2 and a destination space 4. The origination space 2 defines the place and time at which the communication originates. The destination space 4 defines the place and time at which the communication is intended to be decoded. The origination space 2 and the destination space 4 can be remote in location. Alternatively, they can be co-located but displaced in time. The space and time correspondence between the origination space 2 and the destination space 4 depends on the nature of a particular communication. The origination space 2 and the destination space 4 are coupled to a common communications channel 6.

This communications channel 6 can bridge a physical space, such as empty air in the case of a cellular voice telephone call. Alternatively, the communications channel 6 can be temporary storage for the communication while time passes between the origination space 2 and the destination space 4, such as a message left in memory on a computer by a first user, for a second user to read at a later time on the same computer. The communications channel 6 can also be a combination of the two, such as telephone cables and storage memory in the case of electronic mail transmission.

At the origination space 2, the original plaintext message 8 is received and encrypted according to the encrypt text/key relation 14, using a provided encrypt key 10, to create a ciphertext message 16. The ciphertext message 16 is received at the destination space 4 via the communications channel 6. An authorized entity having a proper decrypt key 20 can then provide the decrypt key 20 to the destination space 4, where it is applied to the ciphertext message 16 according to a decrypt text/key relation 22 to create a new plaintext message 24 which corresponds to the original plaintext message 8.

The origination space 2 and the destination space 4 can be, for example, computers, or even the same computer. An exemplary computer can have a certain amount of storage space in the form of memory for storing the text/key relation. A microprocessor or similar controller, along with a control structure and random access memory for storing original plaintext and keys provided by a user, can be included in each space and can perform the same functions of the encryption/decryption engine. An input device 26, 28, such as a keyboard, floppy disc drive, CD-ROM drive, or biometrics reader, can also be provided for accepting the key and plaintext message from the origination user, and the key from the destination user. At the destination space 4, an output device 30, such as a monitor, disc drive, or audio speaker, can also be provided to present the new plaintext message to the destination user. The text/key relation can be stored on a floppy disc or other permanent or temporary portable storage, rather than in hard storage in the computer, to allow different text/key relations to be applied by different users or in different situations.

Figure 5:
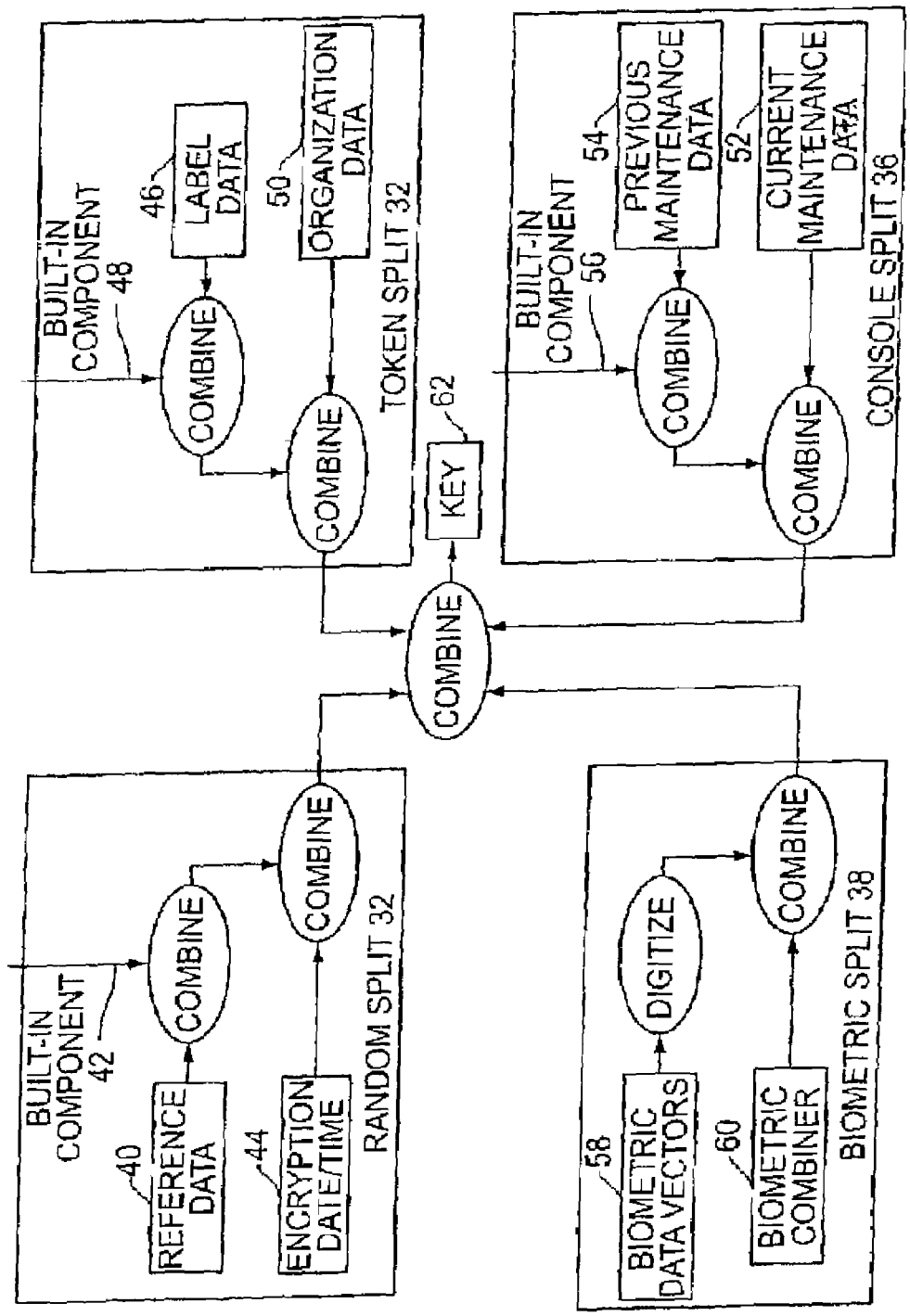
FIG. 5 is a block diagram of a key split combiner.

The keys that are provided at the origination space and at the destination space can be composed of several components, or splits, each of which can be provided by a different source. As shown in FIG. 5, a random key split 32 can be randomly or pseudo-randomly generated. A second split 34 can be stored on a token. A third split 36 can be stored on a console, and a fourth split 38 can be provided by a biometric source. The key splits can be combined to form a complete cryptographic key. This key can take the form of a stream of symbols, a group of symbol blocks, an N-dimensional key matrix, or any other form usable by the particular encryption scheme.

The random split 32 provides a random component to the cryptographic key. This split 32 is randomly or pseudo-randomly generated based on a seed that is provided by any source as reference data 40. For example, when a user attempts to log on to a system, the date and time of the user's log-on attempt, represented in digital form, can be used as a seed to generate the key split. That is, the seed can be provided to a pseudorandom sequence generator or other randomizer to produce a random split. Such pseudorandom sequence generators are well known in the art. For example, a simple hardware implementation could include a shift register, with various outputs of the register XORed and the result fed back to the input of the register.

Alternatively, the seed can be combined, or randomized, with a built-in component 42, such as a fixed key seed stored in the origination space. The randomization can be performed, for example, by applying a variation of the text/key relation to the generated seed and the stored fixed key seed. This result can be further randomized with, for example, a digital representation of the date and time of the encryption 44, in order to produce the random key split 32.

The token split 34, can be generated in a similar fashion. In this case, the seed is provided on a token, that is, it is stored on a medium that is possessed by the user. For example, the seed can be stored on a floppy disc that the system must read as part of the encryption procedure. The token can store a number of different seeds, or label data 46, each of which corresponds to a different authorization provided by the system or specified by the user. For example, one seed can be used to generate a key split to authorize a particular user to read a message at a particular destination space. Another key seed can be used to generate a key split to authorize any member of a group of users to read a message at any destination space, and for one particular user to read the message and write over the message at a particular destination space. The label data 46 can even designate a window of time during which access to the communication is valid. This seed can be randomized with a built-in component 48, such as a seed stored at the origination space, which can then be further randomized with organization data 50 provided to the organization to which the user belongs.

The console split 36 is derived from a changing value stored at a user space, such as on a system console. Maintenance data, such as the checksum taken from a defragmentation table set, can be used to produce such changing values. For example, the current maintenance data 52 can be randomized with particular previous maintenance data. Alternatively, all previous maintenance data 54 can be randomized with a built-in component 56 stored at the origination space, the results of which are XORed together and randomized with the current maintenance data 52. The randomization result of the changing value is the console split 36.

The biometric split 38 is generated from biometric data vectors 58 provided by biometric sample/s of the user. For example, a retinal scanner can be used to obtain a unique retinal signature from the user. This information, in digital form, will then be used to generate the biometric split 38. This can be accomplished by, for example, randomizing a digital string corresponding to the biometric vectors 58 with biometric combiner data 60, which can be a digital hash of the user's system identification number or some other identifying data that can be linked to the user's physical data provided by the biometric reader.

The resulting randomized data is the biometric split 38. The biometric split 38 provides information that is incapable of being reproduced by anyone but the user providing the biometric data vector 58.

The built-in key split components 42, 48, 56 described herein can be static in that they do not change based on uncontrolled parameters within the system. They can be updated for control purposes, however. For example, the built-in key split components 42, 48, 56 can be changed to modify the participation status of a particular user. The key split component can be changed completely to deny access to the user. Alternatively, only a single prime number divisor of the original key split component can be taken from the key split component as a modification, in order to preserve a legacy file. That is, the user will be able to access versions of the file created prior to the modification, but will not be allowed to change the file, effectively giving the user read-only access. Likewise, modification of the key split component can be effectuated to grant the user broader access.

Once key splits 32, 34, 36 and 38 have been generated, they can be randomized together to produce the cryptographic key 62 for the communication. In performing each combination to generate the complete cryptographic key, a different variation text/key relation can be applied.

The use of a plurality of different text/key relation variations adds to the security of the overall cryptographic scheme. It is contemplated that key splits other than those specifically described herein can be combined in forming the complete key 62. The total number of splits can also vary, and these splits can be used to build a key matrix to add to the complexity of the system. This complete key 62 should be in a form suitable for use in the particular cryptographic scheme. That is, different fields in the key can have different functions in the protocol of the communication, and should be arranged accordingly within the key.

At the destination space, the process is reversed in order to determine whether a user attempting to access a message has authorization, that is, has the valid key. The key supplied by the user at the destination space must include information require by the labels that were used to create the token split at the origination space. This information can also take the form of a token split. Further, a biometric split can be required as part of the destination key, in order to provide a link between assigned identification data for the user and physical data collected from the user biometrically. The token split and the biometric split can be combined with the other splits at the destination space to form the complete destination key.

According to another exemplary aspect of the invention, optionally, in initializing a user, at least one of the private signing key, the public signing key, a user cryptographic key, a use ID, at least one cryptographic parameter, the user cryptographic key, the electronic biometrics template and the graphical representation is stored on a token. Accordingly, a user can be required to provide the token in order to electronically sign a document, which further binds the user to an electronically signed document. For example, the private signing key and the user cryptographic key can be stored on a token, which the user must provide in order to electronically sign a document.

According to another exemplary aspect of the invention, optionally, initializing a user further includes updating the user password. A user password can be updated based on a fixed time period (for example, every two weeks, months, etc.), a predetermined number of uses (for example, every 30 uses, etc.), a predetermined event (for example, an unsuccessful validation, etc.), or user discretion. For example, in updating a user password, the user supplies the initial user password and a new user password, the initial verification key and a new verification key are generated based on the respective verification keys, and data encrypted based on the initial verification key is decrypted, and then encrypted with the new verification key and then thereafter stored.

Electronically Signing a Document

Once a user has been initialized, the user can thereafter electronically sign a document according to the present invention.

According to an exemplary aspect of the invention, electronically signing a document includes providing, for a recipient, document data, and providing, for the recipient, signature data. The document data and/or the signature data is digitally signed with the private signing key and/or encrypted with a shared key.

According to the present invention, document data includes data relating to the document being electronically signed. Document-related data can include at least a potion of the document, data derived therefrom, and/or data identifying the document. The at least one portion of the document can be selected by the user, or selected based on a predetermined protocol, either of which can include all portions of the document. Document identifying data can include, for example, a unique document or contract number, a contract date, party names, etc.

According to the present invention, signature data can include at least a portion of digital signals corresponding to one or more handwritten signatures and/or data derived therefrom or corresponding thereto (for example, a graphical representation of a handwritten signature, optionally watermarked; a hash value of the graphical representation or the digital signals, etc.). The digital signals included in signature data can include those received during user initialization, during user authentication (discussed below), and/or those derived from a stored electronic biometrics template.

Optionally, where the signature data includes a graphical representation of a handwritten signature, the graphical representation can be digitally watermarked with watermarking data, according to which the watermarking data is embedded into the graphical representation a predetermined number of times in any manner that does not critically corrupt the graphical representation and allows subsequent identifiable extraction of at least a portion of the watermarked data. Watermarking data corresponds to one or more of, in whole or in part, a recipient ID, document data, and signature data, with plural data items being combined in any consistent manner. According to the present invention, a watermarked graphical representation is critically corrupted if it can no longer be used to generate a visual representation of a biometric signature substantially similar to the at least one or more initial biometric signatures used to generate the graphical representation. At least a portion of the watermarked data is identifiable when it is more likely than not that it uniquely corresponds to the watermarked data.

Optionally, watermarking data is embedded into the graphical representation in a manner that additionally hides, or makes less apparent, the fact that the watermarked graphical representation is watermarked. Also optionally, watermarked data can be embedded into a graphical representation more than once, to increase the likelihood of a subsequent identifiable extraction, such as, for example, when the watermarked graphical representation has been modified. Also optionally, to improve the likelihood of a subsequent identifiable extraction, before embedding, watermarking data can be compressed in any reliable manner such that the same compressed data is produced each time given the same watermarking data. Watermarking data compression can be reversible (for example, archival data compression, etc.), or one-way (for example, hashing, cryptographic hashing).

Optionally, before embedding, the watermarking data can be hashed, which further hides the fact that the graphical representation is watermarked.

According to another exemplary aspect of the invention, optionally, electronically signing a document can also include authenticating a user. In this case, providing the document data and providing the signature data require that the user has been successfully authenticated.

According to the present invention, user authentication can include receiving digital signals corresponding to at least one biometric signature provided by the user and/or receiving a user password provided by the user.

According to an exemplary embodiment of the invention, user authentication includes comparing the digital signals to a stored electronic biometrics template to provide an authentication result. In comparing the digital signals to the stored template, the digital signals can be converted to a temporary template, which can then be compared to the stored template. However, if the initial mathematical transformation used to generate the stored template has an inverse, the stored template can be converted to temporary signals, which can than be compared to the digital signals.

Additionally, or alternatively, user authentication includes generating, based on the user password, a verification key, and verifiably decrypting, based on the verification key, at least one of a stored encrypted private signing key, a stored encrypted public signing key, at least one stored encrypted cryptographic parameter, a stored encrypted user cryptographic key, a stored encrypted electronic biometrics template, a stored encrypted graphical representation, and a stored encrypted at least a portion of a notary response, to provide an authentication result. As described above, a verification key can be generated in any repeatable manner, such that the same verification key can be subsequently generated given the same conditions. If a verification key is optionally bound to a stored electronic biometrics template, user authentication via a successful biometrics comparison and/or a successful decryption allows the release (or generation) of the verification key.

According to the present invention, document data and/or signature data can be digitally signed with the private signing key, which provides a heightened level of recipient trust in the reliability of the electronically signed document. However, it should be noted that according to the present invention, "digitally signing data with a private signing key" can include encrypting the data, or a cryptographic hash of the data, with the private signing key.

According to the present invention, document data and/or signature data can be encrypted with a shared cryptographic key, which provides a heightened level of trust in the reliability of the electronically signed document. Accordingly, a recipient can decrypt the encrypted document data and/or encrypted signature data, which heightens the level of trust in the reliability of the electronically signed document.

According to the present invention, optionally, a shared cryptographic key can be generated based on keying data in any consistent manner, such that the same shared key is generated each time given the same keying data. Keying data corresponds to one or more of, in whole or in part, user data, signature data, document data, notary data, recipient data, device data (for example, a serial number, unique or pseudo-unique identifier, etc.), and any other selected or generated data. Alternatively, or additionally, a shared key can be generated, in whole or in part, using a cryptographic key split combiner method, which includes generating a plurality of cryptographic key splits from seed data, and randomizing the cryptographic key splits to produce the verification key. At least one of the seed data corresponds to at least a portion of the keying data. Thus, a recipient can re-generate, with the requisite keying data, the shared key, and decrypt the encrypted document data and/or encrypted signature data to provide heightened trust in the reliability of the electronically signed document.

In summary, the present invention offers an ability to bind a physical signature that has been transformed with some data that gets encrypted with an asymmetric encryption algorithm and possibly signed by a digital signature, with the intent to create an electronic signature with a person's physical signature. This application can be broadened such that symmetric encryption, such as with CKM, can be added, and other biometric events can be involved in the place of or in addition to the written signature. The result would be to offer two encryption processes and whatever biometrics to be bound with applications in general. The result can be included in a host process such as a SIM (Subscriber Identity Module) for closer relation to commercial applications.

For example, a SIM is a typical component of a cell phone (for example, a GSM phone, and some 2.5 G and 3G phones). The SIM is used as a memory host for identity data; however, in an unlocked mode, a SIM can be swapped and exchanged for one with a more capable processor with a larger memory. A smart card with a contact chip could be modified to become a SIM through another step after the card is manufactured.

A properly equipped cell phone can read a bar code using a mobile value added service (MVAS), which subsequently converts the bar code into an URL and website for use with applications. Using a SIM-equipped cell phone, the bar code can be read and transformed in a digital representation that is further processed by the cell phone, for example, via an interface bridging the SIM to the cell phone's CPU. An optional biometric event is included by having an individual capture whatever the biometric event is (such as the signature being captured by a digital graphical pad (tablet) and transformed into a digital representation), and a biometric template is created as part of the transformation and forwarded to the cell phone for processing. The next step is to encrypt the digital form of the bar code, the digital form of the template, and selected data from an application. The bar code encryption can be done either separately of the template or bound to the template as it is encrypted with the data. The processing can be done in the phone's processor or in the SIM with its processor. An encrypted biometric template is forwarded to other locations where a validation might be required. Keys for decryption of the biometric template would also be distributed to the other locations, and other keys would be included for decryption of a bundled encrypted biometric, bar code, and data. A physical representation of the biometric template, such as a physical signature, is also forwarded so that if the biometric is decrypted, it can be compared (either visually or machine compared) to determine validity of the included bar code and data. A decryption would validate that it came from a registered person who was a user of a commercial application that included a SIM capability; the owner of the commercial application would be the distributor of the keys to maintain control over the process.

The intent would be to use the cell phone with its SIM device to capture a bar code and an optional biometric event and bind them to some application data that could be processed by the SIM to result in encrypted data that would be forwarded into the network for distribution in support of some commercial application. The application can treat the encrypted data for distribution in a network where another cell phone or a fixed site could receive and decrypt the bundle. The decrypted bar code can be further processed as desired. The biometric event can remain decrypted unless a validation is required, in which case the biometric template is decrypted and compared with a physical sample.

The descriptions of the present invention provided herein are not limiting of the present invention, but rather are exemplary embodiments of the present invention as currently contemplated by the inventors, and can be modified within the spirit and scope of the present invention.

Preferred and alternative embodiments have been described in detail. It must be understood, however, that the invention is not limited to the particular embodiments describer herein. Rather, the invention is defined by the following claims, which should be given the broadest interpretation possible in the light of the written description and any relevant prior art.

The invention claimed is:

1. For an electronic signature device comprising a processor, a memory, a user input device including a first biometric input device, and a device interface, all communicatively connected by at least one bus, a method of personalizing the electronic signature device to a user, comprising:
   receiving a digitized biometric signature of the user via the first biometric input device;
   generating a cryptographic key according to a predetermined cryptographic scheme;
   generating a biometric electronic template based on said digitized biometric signature; and
   storing said cryptographic key and said biometric electronic template in the memory;
   wherein generating cryptographic keys includes
   generating a prime parameter, a sub-prime parameter, and a base parameter;
   generating a signing private key;
   generating a signing public key based on said prime, sub-prime, and base parameters; and
   generating a user public key based on said signing private key and said prime and base parameters; and
   further comprising storing said prime, sub-prime, and base parameters, and said signing private and public keys in the memory.

2. The method of claim 1, wherein generating cryptographic keys includes generating keys according to a symmetric constructive key management scheme.

3. The method of claim 2, wherein the symmetric constructive key management scheme utilizes credentials and only a random number key spin.

4. The method of claim 1, wherein the user interface further comprises a password input device, and said method further comprises:
   receiving a user password via the password input device;
   generating a password encryption key based on the user password;
   encrypting a known value with the password encryption key to produce an encrypted output; and
   storing the encrypted known value in the memory.

5. The method of claim 4, wherein said known value is said biometrics electronic template.

6. The method of claim 1, wherein receiving said digitized biometric signature is repeated at least once.

7. The method of claim 1, wherein receiving said digitized biometric signature and generating said biometrics electronic template are repeated at least once.

8. The method of claim 1, wherein said biometric electronic template is generated based on a mathematic transformation of said digitized biometric signature.

9. The method of claim 8, wherein the mathematical transformation is a Fourier transformation.

10. The method of claim 1, wherein the electronic signature device is communicatively connected to a certificate authority via the device interface, and said method further comprises:
   sending a certificate request to the certificate authority;
   receiving a certificate package from the certificate authority; and
   storing said certificate package in the memory.

11. The method of claim 10, wherein said certificate package comprises a digital certificate.

12. The method of claim 10, wherein said certificate package comprises a digital certificate and a root value.

13. The method of claim 1, wherein the device interface is a card interface.

14. The method of claim 1, wherein the electronic signature device further comprises a power source that is at least one of a battery and the computer interface.

15. The method of claim 1, wherein the first signature input device is integral with the electronic signature device.

16. The method of claim 1, wherein the first signature input device is connected to the at least one bus through the device interface.

17. The method of claim 1, wherein at least a portion of said user interface is integral with the electronic signature device.

18. The method of claim 1, wherein at least a portion of said user interface is connected to the at least one bus through the device interface.

19. The method of claim 1, further comprising printing a graphic indicium that is based at least in part on at least one of the digitized biometric user signature of the user, the cryptographic key, and the biometric electronic template.

20. The method of claim 19, wherein the graphic indicium is a bar code.

21. For an electronic signature device comprising a processor, a memory having a biometric electronic template stored therein, a user interface comprising a biometric signature input device, a device interface adapted to interface a computer, and at least one bus operably connected to the processor, the memory, the user interface, and the device interlace, a method of originating an electronically signed transaction, said method comprising:
- verifying whether a user is permitted to originate the electronically signed transaction with the electronic biometric signature device, comprising
  - receiving a digitized biometric originator signature via the user interface, and
  - comparing said digitized biometric originator signature against the biometric electronic template to produce a first verification result;
- receiving a transaction package through one of the user interface and the device interface;
- combining said transaction package and one of said digitized biometric signature and a digitized biometric user signature extracted from the biometric electronic template to produce an originator biometric signature block;
- generating a cryptographic key;
- encrypting said originator biometric signature block with said cryptographic key to produce an encrypted biometric signature block;
- combining said encrypted biometric signature block and said cryptographic key to produce an electronically signed transaction; and
- if the user is verified, providing said electronically signed transaction via the device interface;
- wherein the memory further has a biometric electronic template, a prime parameter, a sub-prime parameter, and a base parameter, user public data comprising a user public key, and a user private key stored therein, wherein generating a cryptographic key includes
- generating an ephemeral private key based on the prime, subprime, and base parameters;
- generating an ephemeral public key based on said ephemeral private key and the prime and base parameters; and
- generating a shared encryption key based on said ephemeral public key, the user public key, and the prime parameter;
- wherein the cryptographic key is a shared encryption key; and
- wherein said ephemeral private key, the prime parameter, and at least a portion of the user public data are combined with said encrypted biometric signature block and said cryptographic key to produce the electronically signed transaction.

22. The method of claim 21, wherein generating a cryptographic key includes generating a key according to a symmetric constructive key management scheme.

23. The Method of claim 22, wherein the symmetric constructive key management scheme utilizes credentials and only a random number key split.

24. The method of claim 21, wherein the user interface further comprises a password input device, the memory has further stored therein an encrypted known value, and verifying whether the user is permitted to originate the electronically signed transaction with the electronic signature device further comprises
- receiving a user password via the password input device;
- generating a password encryption key based on the user password; and
- decrypting the encrypted known value with said cryptographic key to produce a second verification result.

25. The method of claim 24, wherein the encrypted known value is the biometrics electronic template.

26. The method of claim 21, wherein receiving said digitized biometric originator signature is repeated at least once.

27. The method of claim 21, wherein receiving said digitized biometric originator signature and comparing said digitized biometric originator signature against the biometric electronic template to produce the first verification result are repeated at least once.

28. The method of claim 21, wherein comparing said digitized biometric originator signature against the biometric electronic template comprises generating a temporary template based on said digitized biometric originator signature, and comparing said temporary template to the biometric electronic template.

29. The method of claim 28, wherein said temporary template is generated based on a mathematic transformation of said digitized biometric originator signature.

30. The method of claim 29, wherein the mathematical transformation is a Fourier transformation.

31. The method of claim 21, wherein comparing said digitized biometric originator signature against the biometric electronic template comprises generating a temporary biometric signature based on the biometric electronic template, and comparing said temporary biometric signature to said digitized biometric originator signature.

32. The method of claim 31, wherein said temporary biometric signature is generated based on a mathematic transformation of said digitized biometric originator signature.

33. The method of claim 32, wherein the mathematical transformation is a Fourier transformation.

34. The method of claim 21, further comprising printing a graphic indicium that is based at least in part on at least one of the digitized biometric user signature of the user, the cryptographic key, and the biometric electronic template.

35. The method of claim 34, wherein the graphic indicium is a bar code.

* * * * *